United States Patent

[11] 3,593,839

[72] Inventor Edward Peter Smith
London, England
[21] Appl. No. 844,078
[22] Filed July 23, 1969
[45] Patented July 20, 1971
[73] Assignee BTR Industries Limited
London, England
[32] Priority July 23, 1968
[33] Great Britain
[31] 35,152/68

[54] CONVEYORS
9 Claims, 5 Drawing Figs.
[52] U.S. Cl. ................................................... 198/184
[51] Int. Cl. ................................................. B65g 15/60
[50] Field of Search ......................................... 198/108, 129, 184

[56] References Cited
UNITED STATES PATENTS
756,600 4/1904 Dodge ........................ 198/184 X
2,066,206 12/1936 Laurie ......................... 198/184

Primary Examiner—Edward A. Sroka
Attorney—W. A. Shira, Jr.

ABSTRACT: A conveyor having a belt and continuous bearing elements near the lateral edges of the belt to support the belt, in which there is means to supply fluid under pressure to the gaps between the bearing elements and the belt to form a fluid bearing for the belt. The bearing elements may have convex surfaces, and the belt may have cooperating concave surfaces of very slightly smaller concavity, whereby the gaps are narrowest at the edges of the bearing elements. Preferably, the bearing elements are hollow and there is means to supply pressurized fluid to the hollow elements, and thence to the gaps between the bearing elements and the belt.

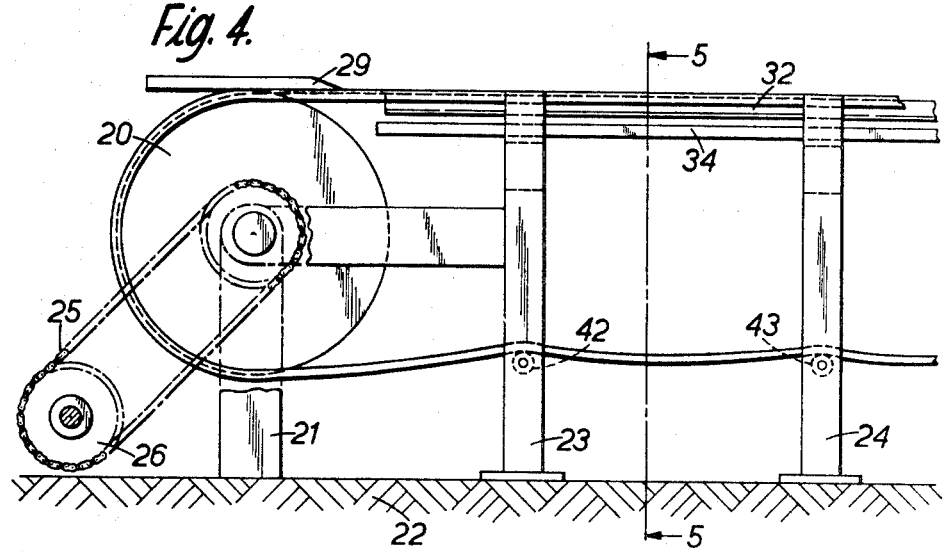
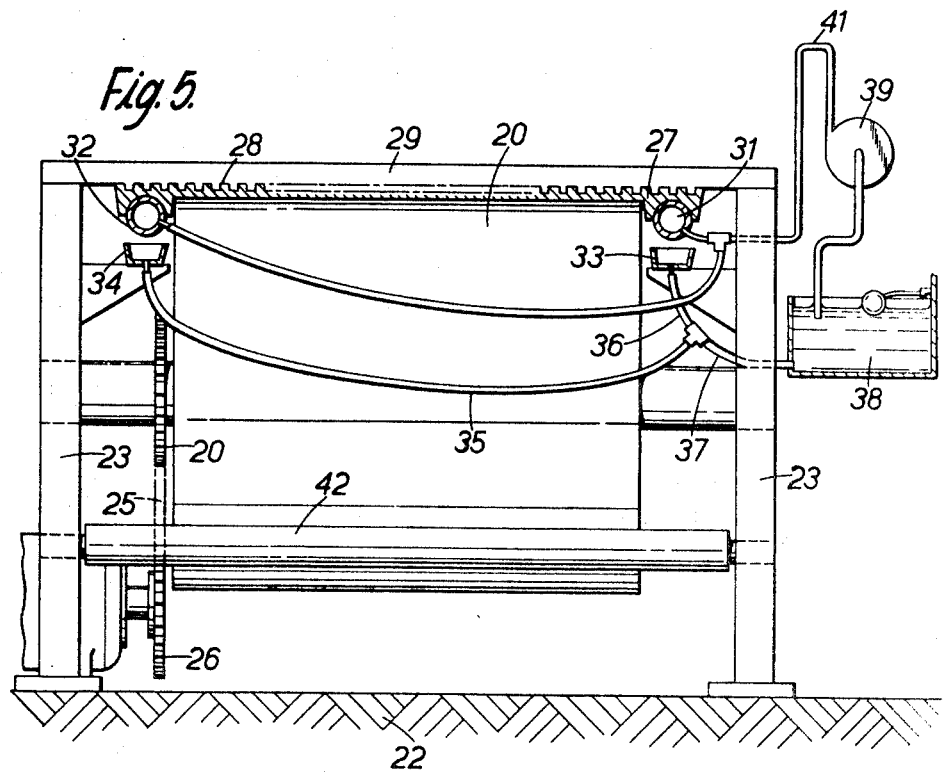

CONVEYORS

This invention relates to conveyors.

The invention provides a conveyor having a belt which is relatively rigid laterally and relatively flexible in its direction of travel, and continuous bearing elements at or near the lateral edges of the belt to support the belt, in which there is means to supply fluid under pressure to the gaps between the bearing elements and the belt to form a fluid bearing for the belt.

According to a feature of the invention the bearing elements have convex surfaces, and the belt has cooperating concave surfaces of very slightly smaller concavity, whereby the gaps are narrowest at the edges of the bearing elements.

In a preferred form the bearing elements are hollow and there is means to supply pressurized fluid to the hollow elements, and thence to the gaps between the bearing elements and the belt.

In this form it is preferred that there are channels under the hollow elements to catch fluid emitted from the gaps, and there is provision for that fluid to be returned to the fluid supply means.

According to a feature of the invention the fluid is supplied to the gaps through a multiplicity of capillaries or orifices formed or inset in material adjacent to the gaps.

According to a feature of the invention the bearing elements provide or form structural members upholding the belt.

In one preferred form of the invention the material of the belt or bearing elements at the edges of the gaps is flexible so to provide or form a seal.

According to another feature of the invention fluid emitted from the gaps serves to eject foreign material from between the belt and the bearing elements.

It may be preferred that there is a heater or series of heaters to resist the freezing of the fluid in the gaps.

A specific embodiment of the invention will now be described by way of example with reference to the accompanying drawings of which:

FIG. 4 is a sectional view in side elevation of the end of a conveyor, and

FIG. 5 is a section on the line 5-5 in FIG. 4.

Figure 1:
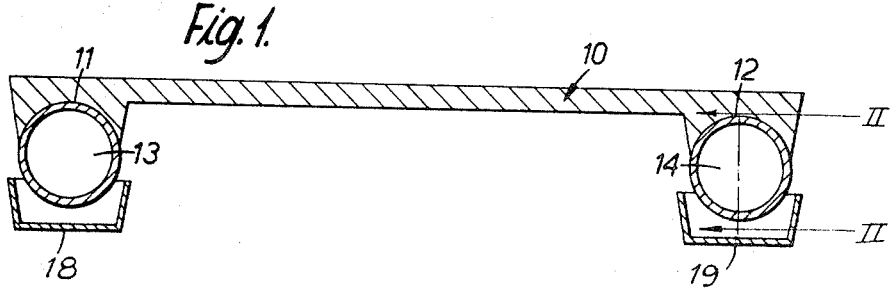
FIG. 1 is a lateral section across a conveyor.
Figure 2:
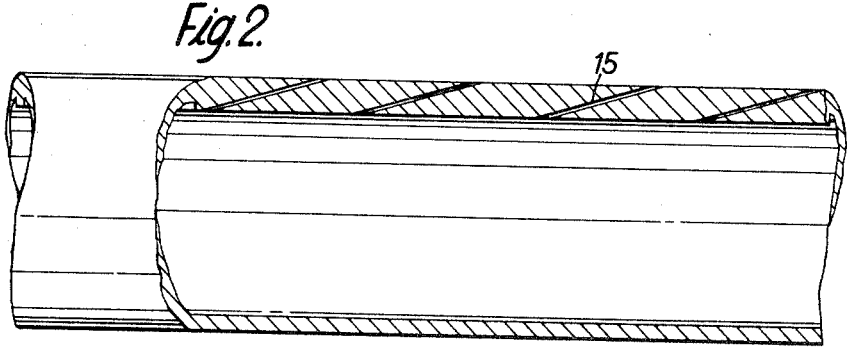
FIG. 2 is a sectional view in FIG. 1.
Figure 3:
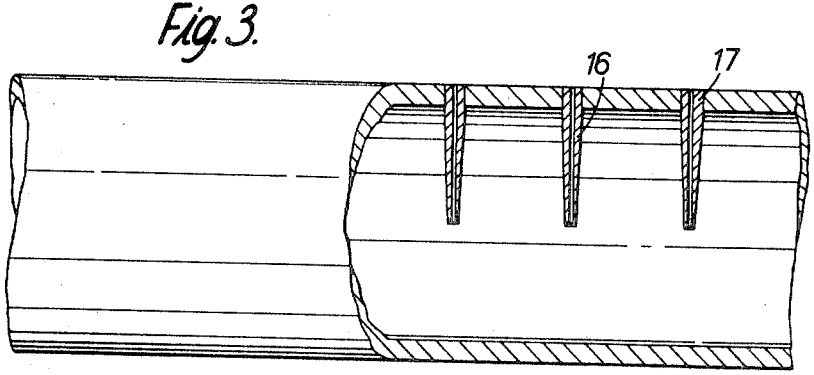
FIG. 3 is a view corresponding to FIG. 2 and showing a variant thereof.

As shown in FIG. 1, a conveyor belt 10, which is stiff laterally and flexible longitudinally has downwardly concave edges 11 and 12. Along the edges of the conveyor there are tubes 13 and 14 supported at intervals on the framework of the conveyor, and the edges of the conveyor rest on the tubes. The tubes are supplied with a pressurized fluid (such as air, water or oil) which is allowed to escape through capillaries or orifices spaced apart along the tops of the tubes. The capillaries 15 may be made by forming suitably fine holes at an acute angle in the tube wall as shown in FIG. 2 or may be separate assemblies 16 fitted in holes 17 as indicated in FIG. 3. Alternatively fine orifices may be provided in the tube wall. The capillaries or orifices are placed at intervals along the tube so that preferably there are between two and 12 outlets per foot of tube. The tube may be of any material.

Along the underside of each edge 11 and 12 there is moulded a rubber bearing strip containing a concave portion substantially of the same radius as the bearing tube. Fluid losses may be reduced by making the radius of this bearing strip slightly less than that of the tube. The arc formed by the concave portion of the rubber-bearing strip will have an included angle preferably between 120° and 180°.

When a liquid lubricant (such as oil or water) is used, channels 18 and 19 are placed under the tubes 13 and 14 to collect the escaping liquid and to return it to a reservoir, arranged to feed the means to pressurize the liquid.

The method of operation is as follows: Pressurized fluid flows along the tubes 13 and 14 and up the capillaries or through the orifices so to exert a pressure on the underside of the conveyor edges 11 and 12 thereby forcing the conveyor upwards. This creates or increases gaps between the edges of the bearing strips and the tubes and allows the lubricant to escape. The conveyor, therefore, is riding on a fluid film between each of its edges 11 and 12 and the tubes 13 and 14 respectively.

The pressure drop in the fluid flowing through the capillaries or orifices is proportional to the flow rate and consequently the pressure under the bearing strips is inversely proportional to the flow rate.

When the belt is lightly loaded there is a maximum clearance between it and the tube and most of the pressure drop occurs in the capillaries or orifices. When the belt is heavily loaded the clearance is minimal and flow rate is low. Therefore, most of the pressure drop occurs between the outlets from the tube and the extremities of the bearing strip. However, because the pressure drop for a constant volume flow rate is inversely proportional to the cube of the film thickness, the geometry of the bearing ensures that it is only at the extremity of the bearing strip that an appreciable pressure drop occurs, because it is there that the film thickness is a minimum. This effect will be accentuated by deflection of the rubber in the areas of high pressure (i.e. on top of the tube).

The use of a bearing such as has been described in this specific embodiment of the invention has among others the following advantages.

The power consumed in pumping the fluid and in driving the conveyor belt to overcome the viscous resistance is considerably less than the power consumed in overcoming for instance the rolling friction resistance of rollers which might be employed to support the conveyor belt.

The bearing tube forms the means of delivering the lubricant, the bearing surface, and a rigid edge support for the belt, thereby saving on the cost of an alternative structure which might be needed, such as rollers.

Features of the invention illustrated in the above description of the specific embodiment include the use of the tube in its triple function, the use of a hydrostatic bearing as described with one of the bearing surfaces being flexible, and the use of hydrostatic bearings to support the edges of a laterally stiff conveyor belt.

FIGS. 4 and 5 show the end of a conveyor-belt arrangement, and in these Figures an end drum for the conveyor is designated as 20. The end drum 20 is supported on a pair of pillars 21 upstanding from a floor 22. There are further pillars 23 and 24 upstanding from the floor of which pillars 23 can be seen in the sectional view in FIG. 5.

The end drum 20 is driven by a chain 25 which is in turn driven by a drive wheel 26.

The conveyor passing round the drum shown in FIGS. 4 and 5 is of the type illustrated in FIG. 1, and the conveyor belt, here designated 27 has longitudinally running grooves 28 which engage with a safety comb 29 at the end of the conveyor and generally above the end drum 20.

Supported on the pillars 23 and 24 there are relatively rigid tubes 31 and 32 of circular cross section. These tubes 31 and 32 are disposed beneath the edge portions of the conveyor and form bearing elements therefor. The tubes are of the type shown in detail in FIG. 2 or FIG. 3, and underneath the tubes there are channels 33 and 34 which gather fluid emitted from the gaps between the conveyor and the tubes 31 and 32. The channels are drained by drain pipes 35 and 36 which lead back through a common pipe 37 to a reservoir 38. A pump 39 draws fluid from the reservoir and pumps this fluid under pressure through a pipe 41 to the interior of the tubes 31 and 32.

After passing over the end drum 20 the return run portion of the conveyor passes over idler rollers 42 and 43 supported between the pillars 23 and the pillars 24 respectively.

In operation fluid is pumped to the tubes 31 and 32 by the pump 39, and is emitted from the tubes through the convex external surfaces thereof. The fluid is trapped in the gap between the edges of the conveyor and the convex external surfaces of the bearing elements, so to form a fluid bearing. The edges of the concave portion of the conveyor belt which surround the surface emitting the liquid may be flexible, and it is a feature of the invention that the radius of curvature of the concave surface on the underside of the conveyor belt is very slightly less than the radius of curvature of the tubes 31 and 32. Heaters in or under the tubes 31 and 32 may delay freezing of the fluid therein and in normal circumstances the belt will be supported on a fluid trapped in the gaps between the tube and the belt. The conveyor is drawn along by the action of the end drum 20 and there are at the ends of the channels 33 and 34 dams which stop leakage of fluid as the fluid is emitted from the end of the interface.

The tubes 31 and 32 may be of plastics material, but can conveniently be made of steel so that the tubes form the main support for the conveyor belt. The tubes are rigidly attached to the pillars 23 and 24.

I claim:

1. A conveyor comprising a belt which is relatively rigid laterally and relatively flexible in its direction of travel, laterally spaced supporting surfaces on the inner face of said belt adjacent the edges thereof, and laterally spaced continuous bearing elements near the lateral edges of the belt cooperating with said surfaces on the belt to support the latter only adjacent its edges, and means to supply fluid under pressure to the gaps between the bearing elements and the belt to form a fluid bearing for the belt.

2. A conveyor as claimed in claim 1 in which the bearing elements have convex surfaces, and the said supporting surfaces on the belt have cooperating concave surfaces of very slightly smaller concavity, whereby the gaps are narrowest at the edges of the bearing elements.

3. A conveyor as claimed in claim 1 in which the bearing elements are hollow and there is means to supply pressurized fluid to the hollow elements, and thence to the gaps between the bearing elements and the belt.

4. A conveyor as claimed in claim 3 in which there are channels under the hollow elements to catch fluid emitted from the gaps, and there is provision for that fluid to be returned to the fluid supply means.

5. A conveyor as claimed in claim 1, in which the fluid is supplied to the gaps through a multiplicity of capillaries inset in material adjacent the gaps.

6. A conveyor as claimed in claim 1, in which the fluid is supplied to the gaps through a multiplicity of orifices formed in material adjacent the gaps.

7. A conveyor as claimed in claim 1 in which the bearing elements form structural members upholding the belt.

8. A conveyor as claimed in claim 1 in which the material of one of the belt and bearing elements at the edges of the gaps is flexible so to form a seal.

9. A conveyor as claimed in claim 1 in which fluid emitted from the gaps serves to eject foreign material from between the belt and the bearing elements.

UNITED STATES PATENT OFFICE
CERTIFICATE OF CORRECTION

Patent No. 3,593,839          Dated July 20, 1971

Inventor(s) Edward Peter Smith

It is certified that error appears in the above-identified patent and that said Letters Patent are hereby corrected as shown below:

Column 1, line 43, after "view" insert ---along the line II-II---; Column 2, line 66, before "conveyor" insert ---edges of the---.

Signed and sealed this 25th day of January 1972.

(SEAL)
Attest:

EDWARD M. FLETCHER, JR.          ROBERT GOTTSCHALK
Attesting Officer                  Commissioner of Patents